Nov. 3, 1959     W. B. SCHUMACHER     2,911,254
VEHICLE LOAD COVER RETAINING MEANS
Filed March 26, 1958     2 Sheets-Sheet 1
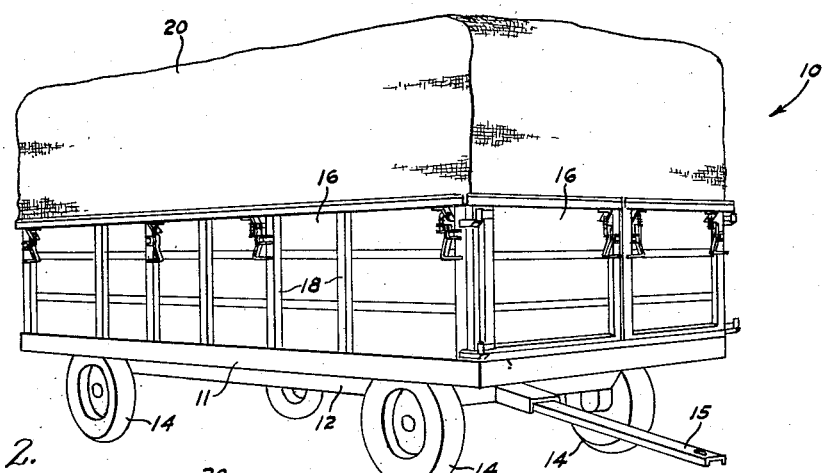
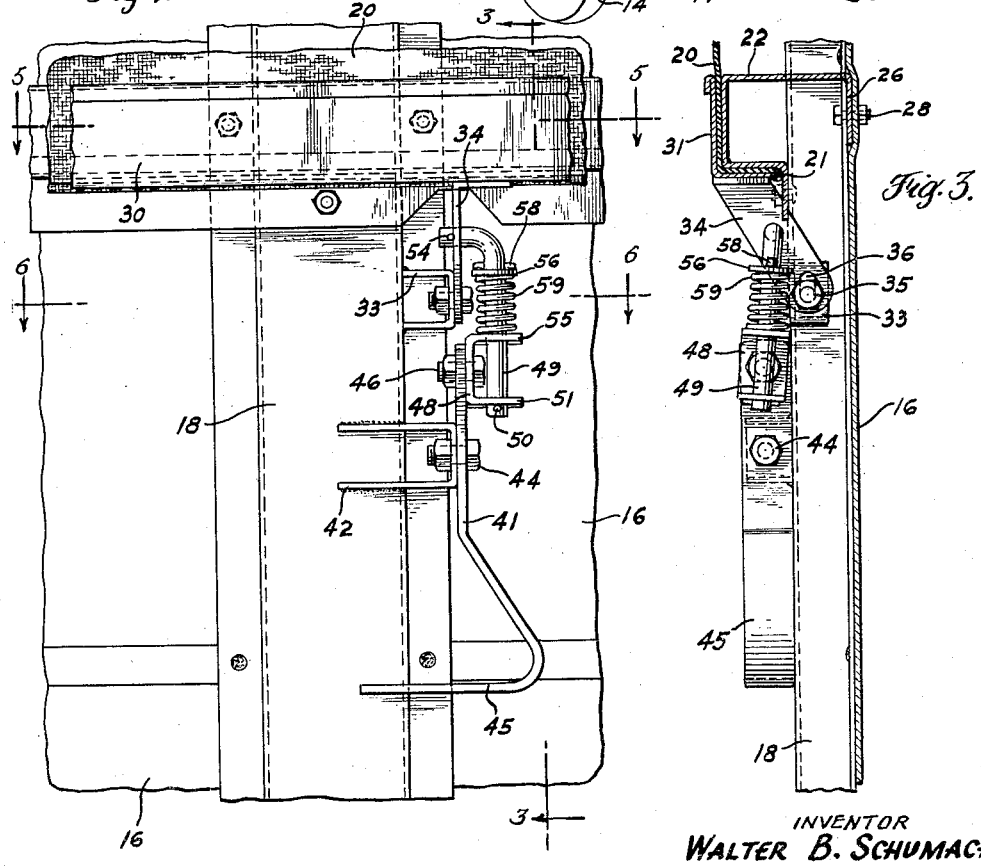
INVENTOR
WALTER B. SCHUMACHER
BY Joseph Allen Brown
ATTORNEY Nov. 3, 1959     W. B. SCHUMACHER     2,911,254
VEHICLE LOAD COVER RETAINING MEANS
Filed March 26, 1958     2 Sheets-Sheet 2
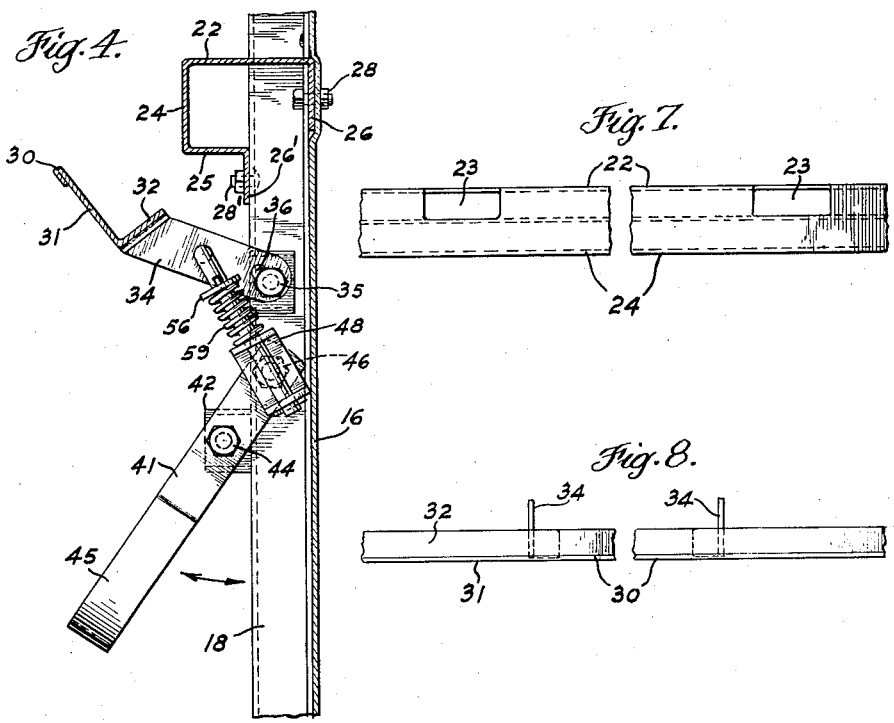
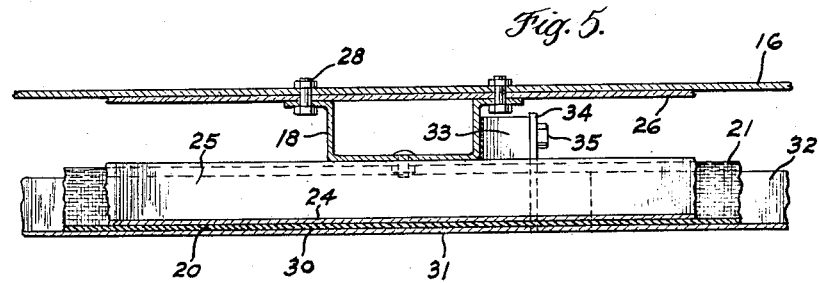
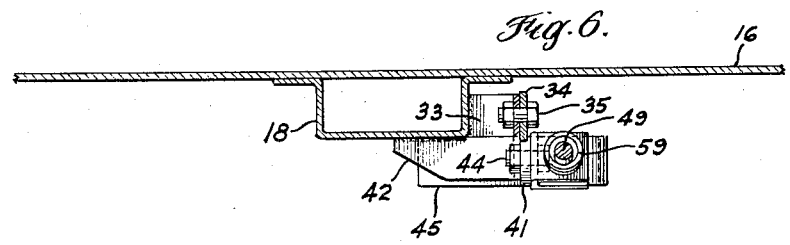
INVENTOR
WALTER B. SCHUMACHER
By Joseph Allen Brown
ATTORNEY United States Patent Office 2,911,254
Patented Nov. 3, 1959

2,911,254

VEHICLE LOAD COVER RETAINING MEANS

Walter B. Schumacher, New Holland, Pa., assignor to Sperry Rand Corporation, New Holland, Pa., a corporation of Delaware Application March 26, 1958, Serial No. 724,023

3 Claims. (Cl. 296—100)

The present invention relates generally to a device for fastening a cover to a vehicle. More specifically, the invention relates to a device for connecting the lower edge of a hood-like cover to the sides of a wagon body.

A conventional crop drying wagon has a slatted floor through which air may pass, and side walls of sheet metal or the like which prevent lateral escape of air. Such a wagon is adapted to be loaded with hay bales which when piled up extend above the wagon sides. A cover is provided for the wagon and adapted to enclose the bale load, the lower edge of the cover being connectable to the wagon side walls. Heated air may be forced through a suitable opening in the cover and into a plenum chamber formed between the cover and the bale load. The air may pass downwardly through the bales and escape through the wagon floor. Usually a cover for a crop drying wagon is made from a canvas-like material treated to make it air impervious. While the loss of air through the cover is readily controllable within acceptable limits, the loss of air through the connection between the cover and the wagon side walls is more difficult.

Heretofore, it has been a problem to fasten the cover to the wagon side walls so that a substantially air tight seal is provided. The solution of this problem is a main object of this invention.

Another object of this invention is to provide means for fastening the lower edge portion of a covering to wagon side walls, such means being adapted to compensate for variations in the thickness of the covering caused by folds at various points in the covering lower edge portion.

A further object of this invention is to provide fastening means of the character described by which a cover can be quickly and easily fastened to the side walls of a wagon.

A further object of this invention is to provide fastening means of the character described which securely holds the cover from pulling loose once it has been fastened in place.

A still further object of this invention is to provide fastening means which is relatively simple and has few parts thereby enabling its manufacture and assembly at low cost.

Other objects of this invention will be apparent hereinafter from the specification and from the recital in the appended claims.

In the drawings:

Fig. 1 is a perspective view of a wagon having a hood-like cover the lower edge of which is fastened to side walls of the wagon by means constructed according to this invention;

Fig. 2 is an enlarged fragmentary side elevation of one of the actuating clamping devices employed, such device being shown in closed, operative position;

Fig. 3 is a section taken on the line 3—3 of Fig. 2 looking in the direction of the arrows;

Fig. 4 is a view similar to Fig. 3 but showing the actuating clamping device in opened, inoperative position;

Fig. 5 is a section taken on the line 5—5 of Fig. 2 looking in the direction of the arrows;

Fig. 6 is a section taken on the line 6—6 of Fig. 2 looking in the direction of the arrows;

Fig. 7 is a plan view of a wagon rail which comprises part of the fastening means; and Fig. 8 is a plan view of a portion of the cover holding member of this invention.

Referring now to the drawings by numerals of reference, and first to Fig. 1, 10 denotes generally a wagon having a bed or base 11 supported on a chassis 12 having ground wheels 14. A drawbar 15 is provided for towing the wagon. Mounted on the wagon bed 11 and extending vertically upwardly therefrom are side walls 16 made of sheet metal or the like. The side walls are connected to and supported by vertical uprights 18 suitably fastened at their lower ends to the wagon bed. Although not shown, the wagon bed has longitudinally extending, relatively spaced slats whereby air may pass through the bottom of the wagon. The wagon is adapted to be loaded with hay bales, and when so loaded the load extends considerably above the tops of the side walls 16.

For covering the wagon load, a cover 20 is provided made of canvas or the like. Preferably, an arched framework, not shown, supports the cover. However, if desired, the cover may be supported by the bales. Cover 20 is adapted to be substantially impervious to air; and it has a beaded lower edge 21 (Fig. 3).

Connected to the side walls 16 is a horizontally extending rail 22 having openings 23 (Fig. 7) for reception of the uprights 18. Rail 22 is spaced vertically from bed 11 and extends completely around the wagon. The lower portion of cover 20 is adapted to be wrapped around the rail.

It will be noted from Figs. 3 and 4 that the rail 22 projects outwardly from the side of the wagon body and beyond the outward extension of the uprights 18. The rail is of such configuration that it has a vertical outside face 24 (Fig. 4) and a horizontal bottom face 25. A down-turned flange 26 is provided on the rail whereby it may be connected to the adjacent portion of side wall 16 by nuts-bolts 28. A down-turned flange 26' is also provided on the rail for connecting it to uprights 18 by nuts-bolts 28'.

Cooperative with rail 22 to clamp the lower edge portion of cover 20 to side walls 16 and to provide a substantially air-tight connection is a movable clamp member 30, shown in closed, operative, clamping position in Fig. 3 and open, inoperative position in Fig. 4. Clamp member 30 has front, rear and side sections which together encircle the wagon. Each section is L-shaped in cross-section having a first clamping portion 31 cooperative with rail side face 24 and a second clamping portion 32 cooperative with rail bottom face 25. Each clamp member section is supported by two or more actuating devices for moving it to an operative or inoperative position. All such devices are of the same construction.

Each device comprises a support arm 34 having one end welded to portion 32 of the clamp member. The opposite end of the support arm is pivotally connected to a bracket 33 on an adjacent upright 18 by a bolt 35 which projects through an elongate slot 36 in the support arm. When the support arm is disposed as shown in Fig. 3 slot 36 extends vertically.

Pivoting of the support arm to move clamping member 30 toward or away from the rail 24 is accomplished by an over-center means comprising a vertically extending lever arm 41 medially pivoted on a bracket 42 welded to the adjacent upright 18. The lever arm is connected to the bracket by nut-bolt 44. The lower end of the lever arm is bent to form a handle 45 (Fig. 2) and the upper end of the lever is pivotally connected to the bight portion of a U-shaped bracket 48. Extending through suitable holes in the legs of bracket 48 is one end of an L-shaped link 49, the other end of which is connected to support arm 34, midway between the ends of the arm. A cotter pin 50 is projected through one end of link 49. Such pin engages leg 51 of bracket 48. A cotter pin 54 holds the other end of link 49 to support arm 34.

Surrounding link 49 and interposed between leg 55 of bracket 48 and a washer 56 held on link 49 by lobes 58 is a spring 59. Spring 59 is operative through washer 56 and lobes 58 to constantly urge link 49 toward support arm 34.

When the fastening means is opened and inoperative, and the parts positioned as shown in Fig. 4, an operator grasping a handle 45 of one of the over-center devices and pressing it toward side wall 16 will cause lever 41 to pivot about the point 44. This in turn will pivot the support arm 34 about pivot 35 bringing clamping member 30 into operative clamping position relative to the rail 22. The operator goes around the wagon and similarly depresses all handles to shift each section of clamp member 30 to clamping position.

As shown in Fig. 3, the lower edge of the canvas cover 20 is adapted to be wrapped around the rail 22 with a portion of the canvas abutting against the outer face 24 of the rail and a portion extending along the rail bottom face 25. Thus the first and second clamping portions 31 and 32 will press canvas against both the outside and bottom of rail 22 when the canvas is fastened in place. Further, it will be noted that the width of the lower portion 32 of the clamp member is less than the outward projection of the rail 22 beyond uprights 18. As a result a space is provided between the lower portion of the clamping member and the uprights 18 to accommodate the beaded lower edge 21 of the canvas. When the canvas has been wrapped around the rail and the clamping device pivoted from the position shown in Fig. 4 to the position shown in Fig. 3, the beaded edge 21 prevents the canvas from being pulled loose.

Occasionally, folds in the canvas will cause variations in thickness of the lower canvas portion. In such case, the clamping member 30 and the supporting arms 34 of the actuating device will yield downwardly against the resistance of the coil springs 59, the range of movement being limited by slots 36.

The described structure is relatively simple, inexpensive to manufacture and assemble, and easy to operate. Because of the wrap-around of the canvas over rail 22 and the cooperation of the clamping member with both the side and bottom of the clamping rail, a substantially air-tight seal is provided. Further, the location of the canvas bead relative to the clamping rail prevents the canvas from pulling out once it has been clamped.

While this invention has been described in connection with a particular embodiment thereof, it will be understood that it is capable of further modification, and this invention is intended to cover any variations, uses or adaptations of the invention following, in general, the principles of the invention and including such departures from the present disclosure as come within known or customary practice in the art to which the invention pertains, and as fall within the scope of the invention and the limits of the appended claims.

Having thus described my invention, what I claim is:

1. A device for clamping the lower edge portion of a covering for a vehicle body or the like to a vertical side wall thereof, comprising a horizontally extending rail affixed to said side wall and projecting outwardly therefrom, said rail having an outside face and a bottom face, a clamp member, means connecting said member to said side wall and below said rail for both pivotal and vertical movement relative thereto, means for pivoting said member to a position wherein said covering may be clamped between the member and said rail, said member having a first clamping portion cooperative with said rail outside face and a second clamping portion cooperative with said rail bottom face, and said pivoting means including resilient means to allow said member to yield vertically relative to said side wall responsive to variations in the thickness of said covering.

2. A device for clamping the beaded lower edge portion of a covering for a vehicle body or the like to a vertical side wall thereof, comprising a horizontally extending rail affixed to said side wall and projecting outwardly therefrom, said rail having an outside face and a bottom face, a clamp member, means connecting said member to said side wall and below said rail for both pivotal and vertical movement relative thereto, over-center means for pivoting said member to a position wherein said covering may be secured between the member and said rail, said member being L-shaped and having a first clamping portion cooperative with said rail outside face and a second clamping portion cooperative with said rail bottom face, the projection of said rail from said side wall being such relative to the width of the second clamping portion of said member that a space is provided for the beaded lower edge of said covering, and resilient means interposed between said member and said over-center means to allow the member to yield vertically relative to said side wall responsive to variations in the thickness of said covering.

3. A device for clamping the beaded lower edge of a covering for a vehicle body or the like to a vertical side wall thereof, comprising a horizontally extending rail affixed to said side wall and projecting outwardly therefrom, said rail having an outside face and a bottom face, an L-shaped clamp member having a first clamping portion cooperative with said rail outside face and a second clamping portion cooperative with said rail bottom face, a support arm having one end connected to said second clamping portion, said support arm having an elongate slot in its end opposite said one end, a pin carried on said side wall below said rail and projecting through said slot, an over-center device pivotally connected to said side wall below said pin for pivoting said support arm and said member on said pin, means connecting said over-center device to said support arm including a spring to allow the support arm and clamping member carried thereon to yield responsive to variations in the thickness of said covering, the projection of said rail from said side wall being such relative to the width of the second clamping portion of said clamping member that a space is provided between the member and side wall beneath said rail for said beaded lower edge of said covering.

References Cited in the file of this patent

UNITED STATES PATENTS 2,743,132    Zahn _____ Apr. 24, 1956